(12) United States Patent  
Salmoiraghi (10) Patent No.: US 8,348,585 B2
(45) Date of Patent: Jan. 8, 2013

(54) SYSTEM AND METHOD FOR UNLOADING AND LOADING LOAD-CONTAINING UNITS FROM AND ONTO RAILWAY TRUCKS

(75) Inventor: Sandro Salmoiraghi, Monza (IT)

(73) Assignee: Salmoiraghi S.p.A., Monza (MB) (IT)

( * ) Notice: Subject to any disclaimer, the term of this patent is extended or adjusted under 35 U.S.C. 154(b) by 196 days.

(21) Appl. No.: 12/698,924

(22) Filed: Feb. 2, 2010

(65) Prior Publication Data

US 2011/0188975 A1    Aug. 4, 2011

(51) Int. Cl.
*B65G 63/02*    (2006.01)
(52) U.S. Cl. ........................................ 414/392; 414/458
(58) Field of Classification Search .................. 414/392, 414/395, 396, 458
See application file for complete search history.

(56) References Cited

U.S. PATENT DOCUMENTS

| 2,004,095 | A | * | 6/1935 | Hankins et al. | ............... 414/345 |
| 4,093,084 | A | | 6/1978 | Ringer | |
| 5,114,295 | A | * | 5/1992 | Jansson | ........................ 414/460 |
| 6,860,698 | B1 | * | 3/2005 | Viragh et al. | ................. 414/458 |
| 2004/0013504 | A1 | | 1/2004 | Schults | |
| 2004/0081540 | A1 | * | 4/2004 | Uebach et al. | ................ 414/395 |
| 2005/0158158 | A1 | | 7/2005 | Porta | |

FOREIGN PATENT DOCUMENTS

| DE | 43 01 019 A1 | 2/2010 |
| EP | 0564555 B1 | 10/1993 |
| EP | 1 476 341 | 11/2004 |
| EP | 2053000 A1 | 4/2009 |
| FR | 2 649 948 A1 | 1/1991 |
| WO | 2006119955 A1 | 11/2006 |
| WO | 2007051631 A1 | 5/2007 |

* cited by examiner

*Primary Examiner* — Saul Rodriguez
*Assistant Examiner* — Jonathan Snelting
(74) *Attorney, Agent, or Firm* — Novak Druce + Quigg, LLP (57) ABSTRACT

A system for unloading and loading load-containing units, such as containers or movable boxes, presenting lift blocks from and onto railway trucks arranged to move on a main track along a longitudinal travel axis. The system including at least two pairs of lifting members separated at least in space above the main track, and able to flank the load-containing unit on opposite sides about the main track and to translate it vertically by achieving a grip on lift blocks.

22 Claims, 9 Drawing Sheets

SYSTEM AND METHOD FOR UNLOADING AND LOADING LOAD-CONTAINING UNITS FROM AND ONTO RAILWAY TRUCKS

The present invention relates to a device and method for unloading and loading load-containing units from and onto railway trucks.

In the state of the art, products of various types are transported in load-containing units, for example containers, which present eight lift blocks in standard positions at the vertices of a parallelepiped. These load-containing units are transported on suitable ships and then transferred onto trains and rubber-tyred vehicles.

Although load-containing units can be easily unloaded from and loaded onto road trucks and rubber-tyred vehicles by a crane, for example a bridge crane, their unloading from and loading onto railway trucks is hindered by the electric line powering the locomotive, which does not allow a crane to operate from above.

This impossibility results in the need to detach the electric locomotive from the train, attach a diesel locomotive and drag the train to a non-electrified railway parking area where the containers are loaded/unloaded by cranes or other equipment which could not operate if the electric power line is present.

To solve these problems, EP 1476341 describes a device comprising means for horizontally transferring the load in different directions by generally using rollers, belts, wheels or chains.

U.S. Pat. No. 4,093,084A describes an installation for horizontally moving containers from or by a railway truck. The movement is obtained by rollers disposed both on the goods transport trucks and on the railway platforms.

FR 2649948A describes a vehicle transport installation comprising boxes, similar to load-containing units, on which the vehicles are disposed. The boxes are moved horizontally by wheels or by a rack disposed both on the train platforms and on the truck panels.

DE 4301019 A describes a loading and unloading device for trains comprising panels to be loaded onto trucks, to be moved transversely to the truck direction and be locked. The invention also comprises bridges enabling the panels to overcome the separation between the truck and platform.

These devices and methods for loading and unloading onto and from railway trucks are implemented by modifying the railway trucks, by inserting for example rollers of longitudinal axis which should enable the containers to be moved horizontally. These solutions are however of difficult implementation, as traditional containers are not made to be rested on the ground but instead exclusively on the four lower (base) lift blocks or coupled to the four upper blocks, and might not withstand their loaded weight. Moreover, modifying railway trucks and containers is extremely costly and the result is of poor flexibility.

An object of the present invention is therefore to provide a system and method enabling said drawbacks to be overcome, a particular object being to provide a system and method for unloading and loading load-containing units provided with lift blocks from and onto railway trucks intended to move along a track overlaid by an electric power line.

Another object is to accelerate the unloading and loading of load-containing units from and onto railway trucks without having to move them away from said track overlaid by the electric power line.

Said objects are attained by a system and method the inventive characteristics of which are highlighted by the claims.

The invention will be more apparent from the ensuing detailed description, provided by way of non-limiting example, of one embodiment thereof illustrated in the accompanying drawings, in which.

Figures from 1 to 6 are perspective views showing the sequence involved in unloading a load-containing unit from a railway truck.

Figures from 10 to 12 show a part of the handling process for the load-containing units 2.

Figure 1:
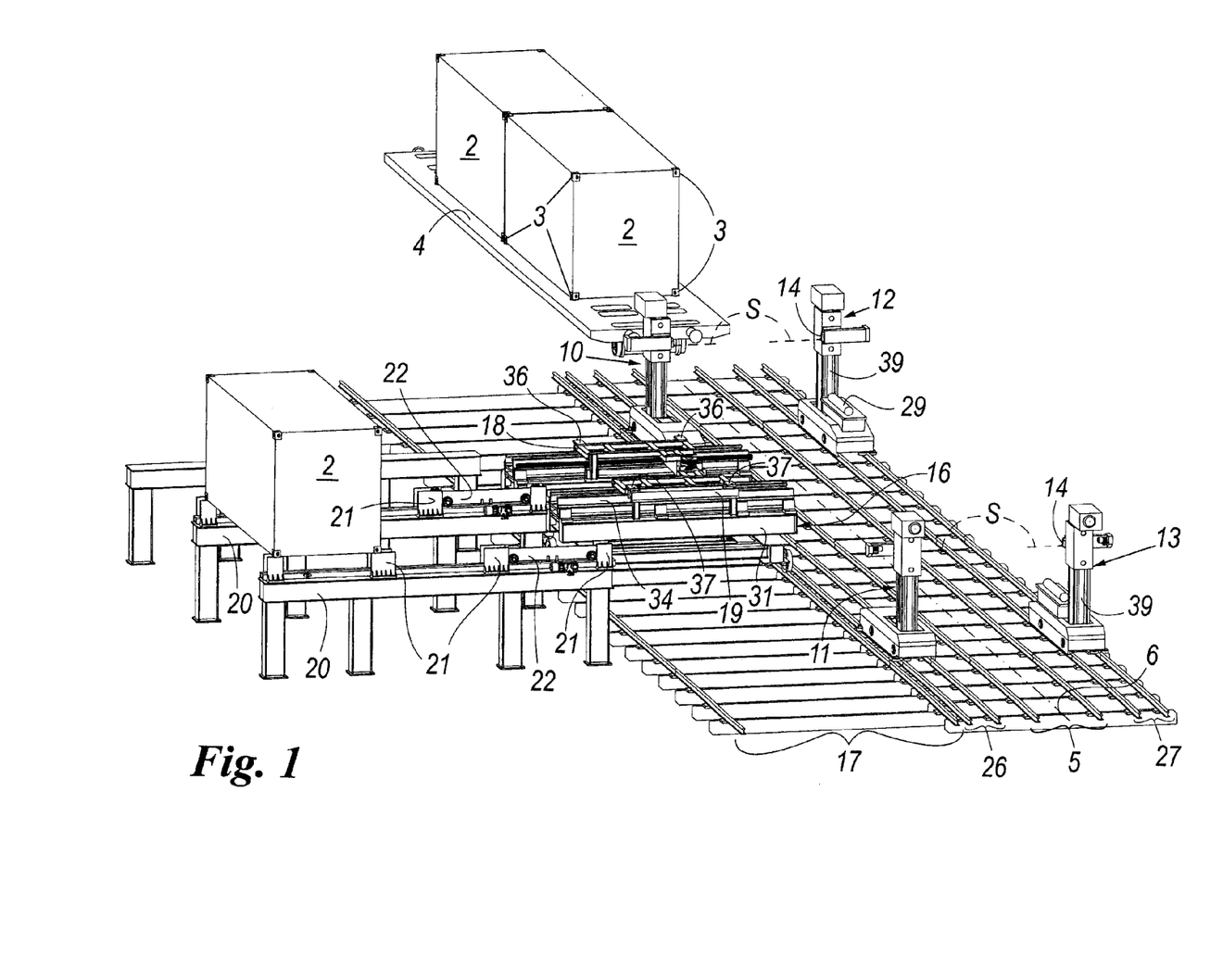
Figures 7, 8:
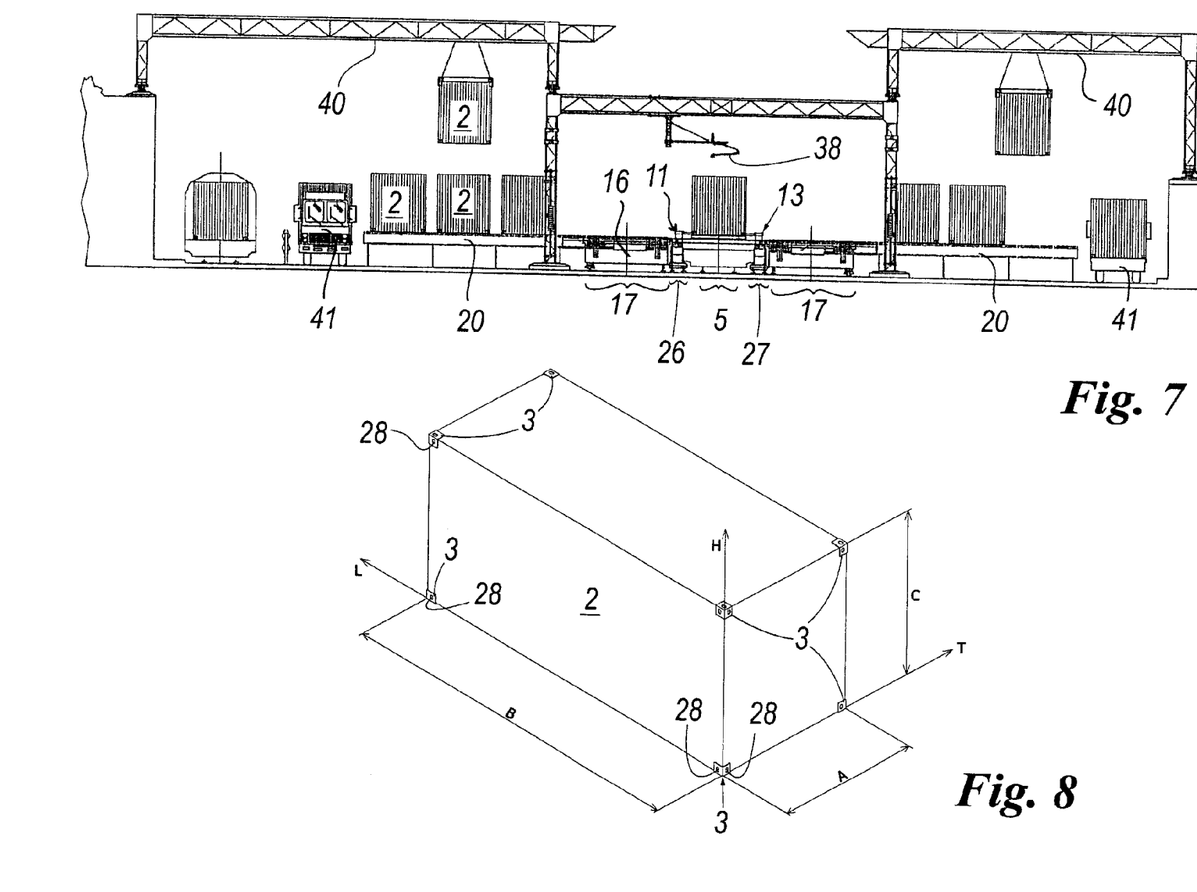
FIG. 7 is a section through the system of the invention.
FIG. 8 shows the lift block arrangement of a generic load-containing unit.

With reference to Figures from 1 to 6, these show a railway truck 4 arranged to move on a main track 5 along a longitudinal travel axis 6 shown substantially at the centre of the main track 5. In FIG. 1 the railway truck 4 is arriving in the station in which the load-containing units 2, disposed on it, are to be unloaded and disposed on a stand-by platform 20, from which they are withdrawn by a crane or other means and disposed for example on rubber-tyred vehicles for intensive distribution of the goods. The load-containing units can be normal containers, which are mainly constructed in two different dimensions (20 and 40 feet in length) or open or closed mobile boxes defining a volume within which the goods are placed. These load-containing units each present eight lift blocks 3 disposed at the vertices of a parallelepiped with sides of predetermined length: four upper blocks (lying in a plane parallel to the plane TL and distant C from it) and four base blocks (lying in the plan e TL), the lift blocks defining the transverse T (width A), longitudinal L (length B) and vertical H (height C) directions, as shown in FIG. 8. The positions, the form and the dimensions of these lift blocks are standardized for all the load-containing units. The parallelepipeds at the vertices of which the eight lift blocks are positioned are mainly of two sizes, with their major side (length B) of 20 feet and 40 feet, even though different sizes exist. The invention is able to operate with load-containing units of any length, including non-standard, provided with lift blocks. These lift blocks 3 present three free surfaces each normal to the other two, to form a vertex of the parallelepiped. All three free surfaces also present coupling holes 28 of standard position and size for coupling and lifting, for example by a crane.

The system of the invention comprises two secondary tracks 26 and 27 disposed on the two sides of the main track 5, one to the right and one to the left and extending at least for a portion parallel to the main track 5, four lifting members 10-13 arranged to flank the load-containing unit 2 on opposite sides about the main track 5, two of these 10 and 11 moving on one of the secondary tracks 26 and the other two 12 and 13 moving on the other secondary track 27. Each lifting member 10-13 comprises a lifting pin 14 having an axis S disposed horizontally in a plane substantially normal to the longitudinal travel axis 6. These lifting pins 14 are arranged to translate in a vertical direction on the lifting member and to slide in the direction of their axis S, to engage in the coupling holes 28 of the lift blocks 3.

Each lifting member 10-13 comprises a recognition device of optical or other type, to automatically recognize the coupling holes 28 of the lift blocks 3 and to automatically position the lifting members 10-13 in proximity to the lift blocks 3 in a position suitable for inserting the lifting pins 14 into the coupling holes 28.

The four lifting members 10-13 are arranged to flank the railway truck 4 on which the load-containing unit 2 is disposed, by moving independently to recognize the coupling holes 28 of the lift blocks 3, to insert the lifting pins 14 into the coupling holes 28 and to vertically lift or translate the load-containing unit 2 by achieving a grip on four lift blocks 3 disposed in pairs on opposite sides about the longitudinal travel axis 6. The vertical translation action of the load-containing unit 2 is achieved by a simultaneous coordinated movement of the lifting pins 14, even though a less stable grip can be obtained on only three lift blocks.

The lifting members 10-13, being separate, moving on opposite sides of the main track 5 and being situated completely outside the limiting railway outline which defines the maximum train cross-section, do not interfere with the movement of the railway truck 4, nor with the electric power line 38 disposed above the main track 5 (see FIG. 7).

It is also possible to have only two lifting members each provided with two lifting pins suitably spaced apart in a horizontal direction, the two lifting members being arranged to move on different secondary tracks 26 and 27, in such a manner as to be able to flank the load-containing unit 2 on two opposite sides about the longitudinal travel axis 6. The two lifting members are separate in the sense that they are not joined together by any mechanical element disposed in the space above the main track. Both however rest on the ground or on a possible common platform disposed below the rails of the main track. However this form of construction allows less flexibility as the system would be suitable for lifting only one type of load-containing unit, with lift blocks disposed in a single predetermined configuration, or would require greater technical complexity of the lifting members by providing for an independent horizontal movement, parallel to the longitudinal travel axis 6, of two lifting pins 14 located in the same lifting member.

The lifting members could also be fixed and the lifting pins be aligned with the lift blocks of the load-containing units by precisely positioning the railway truck.

This solution clearly makes the method more complicated and does not represent a preferred embodiment.

The lifting members 10-13 could also move horizontally in a direction parallel to the main track 5, not guided by secondary tracks 26 and 27 but instead guided for example by a laser guide system or other known guide system. It should be noted that the system is particularly suitable for operating on a main track which is rectilinear or has a radius of curvature compatible with railway regulations.

The system of the invention also comprises a transfer track 17 parallel to the main track 5, disposed such as to leave one of the two secondary tracks 26 between the main track 5 and the transfer track 17. Two primary transfer trucks 15 and 16 move independently on the transfer track 17, each comprising a base 30 and 31, a movable bridge 33 and 34 able to move in a direction substantially transverse to the main track 5 and to the transfer track 17 parallel to it, i.e. substantially horizontal in a plane normal to the longitudinal travel axis 6, and a secondary transfer truck 18 and 19 movable on the base 30, 31 and on the movable bridge 33 and 34, in a direction transverse to the main track 5.

With the load-containing unit 2 lifted by the lifting members 10-13, the transfer trucks 15, 16, by moving on the transfer track 17, flank the lifting members 10, 11 disposed on the secondary track 26 interposed between the main track 5 and transfer track 17.

The system of the invention comprises resting elements 29, rigid with the lifting members 12 and 13 and disposed on the opposite side to that of the transfer trucks 15 and 16 about the main track 5. These resting elements are arranged to support one end of the movable bridges 33 and 34 on the opposite side to that of the transfer trucks 15 and 16 about the main track 5.

The movement of the movable bridges 33 and 34 is of sufficient travel to cause one of their ends to touch and rest on said resting elements 29. In this manner the transfer trucks 18 and 19, with their load consisting of the load-containing unit 2, are able to slide on the movable bridges 33 and 34, which do not project but are supported on both the ends external to the load. At least those lifting members 10 and 11 disposed on the same side of the transfer trucks 15 and 16 about the main track 5 have a shape such as to enable the movable bridges 33 and 34 and the transfer trucks 18 and 19 to pass below their lifting pins 14, i.e. within the space lying vertically below the lifting pins 14.

For this purpose, in the embodiment shown in FIGS. 1-6, each lifting pin 14 is skew to the vertical column 39 of the lifting member resting on a secondary track 26 or 27, in this manner leaving free the space below the lifting pins 14.

The system of the invention comprises, preferably in the resting elements 29, a levelling device for each of the movable bridges 33 and 34, able to vertically move the end of the movable bridges 33 and 34 resting on them, such as to cause the movable bridges 33 and 34 to attain a perfectly horizontal position enabling the transfer trucks 18 and 19 moving on them to move horizontally.

The presence of two independent transfer trucks 15 and 16 confers greater flexibility on the system, so enabling load-containing units of different dimensions to be loaded and unloaded.

If only two lifting members each with two lifting pins were provided, the system flexibility would be limited, in which case a single transfer truck could be provided, of size suitable for the length of the load-containing unit for which the system has been designed.

The transfer trucks 18 and 19, arranged to move on the movable bridges 33 and 34 in a direction substantially transverse to the main track, each present one or two resting surfaces 36 and 37 facing upwards, to hence support two basic lift blocks 3 disposed in a transverse direction.

The loading and unloading system of the invention also comprises at least one stand-by platform 20 presenting elements 21 for supporting the load-containing units 2 via the lift blocks 3 and which extend in a direction substantially transverse to the main track 5, at least within the initial portion facing the main track 5.

These support elements 21 can comprise for example tracks spaced apart such as to enable only the lift blocks 3 or vertically disposed flat elements to rest. Several different stand-by platforms could exist, able to receive load-containing units of different length, which present lift blocks positioned according to the length of the load-containing units. On each stand-by platform 20 there are disposed two positioning trucks 22 arranged to move horizontally along the entire length of the stand-by platform 20. They comprise two vertically movable pistons presenting a horizontal loading surface 25 and are also able to vertically translate the load-containing unit 2 by raising the loading surface 25 and resting it on the outer part of the lower surface of the lift blocks 3, whereas the support elements 21 rest on the inner part of the lower surface of the lift blocks 3 or vice versa. The positioning trucks 22 present only a very small vertical movement, sufficient however to withdraw the load-containing unit from the transfer trucks 18 and 19 and deposit them on the support elements of the stand-by platform 20.

It is also clear that in a different embodiment, two positioning trucks intended to move on a single stand-by platform to move the same load-containing unit could be replaced by a single positioning truck.

The stand-by platform 20 and the movable bridge 18 achieve mutual co-penetration equal at least to the width A of a load-containing unit 2 and such as to enable the transfer trucks 18 and 19 to flank the positioning trucks 22. The stand-by platform 20 is also able to support one end of the movable bridges 33 and 34 when the movable bridges 33 and 34 extend in the direction of the stand-by platform 20, to co-penetrate it. In this manner the transfer trucks 18 and 19, with their load consisting of the load-containing unit 2, can slide on the movable bridges 33 and 34, which do not project, but are supported on both the ends relative to the load. A multiplication of the system elements is possible to accelerate the loading and unloading operations, for example two transfer tracks can be provided disposed on opposite sides of the main track, on each of which two or four or more transfer trucks move, as shown in FIG. 7. The stand-by platforms could also be disposed on both sides of the main track.

By virtue of the automatic recognition system for the lift blocks 3 and coupling holes 4, the system of the invention could also be used for load-containing units presenting lift blocks 3 not disposed in one of the two aforedescribed standard configurations.

Figures from 1 to 6 enable the system operation to be understood. FIG. 1 shows a railway truck 4 with two load-containing units 2, which arrives in a station in which the unloading and loading system of the invention has been provided. The four lifting members 10-13, by moving along the secondary tracks 26, 27, define by means of a visual or other recognition system the position of four lift blocks 3 disposed on the lower base of the load-containing unit 2. The lifting members are positioned on the secondary tracks 26 and 27 to flank the lift blocks 3 such as to insert their lifting pin 14 into the coupling holes 28 disposed on the transverse faces (i.e. normal to the transverse direction) of the base lift blocks 3.

Figure 2:
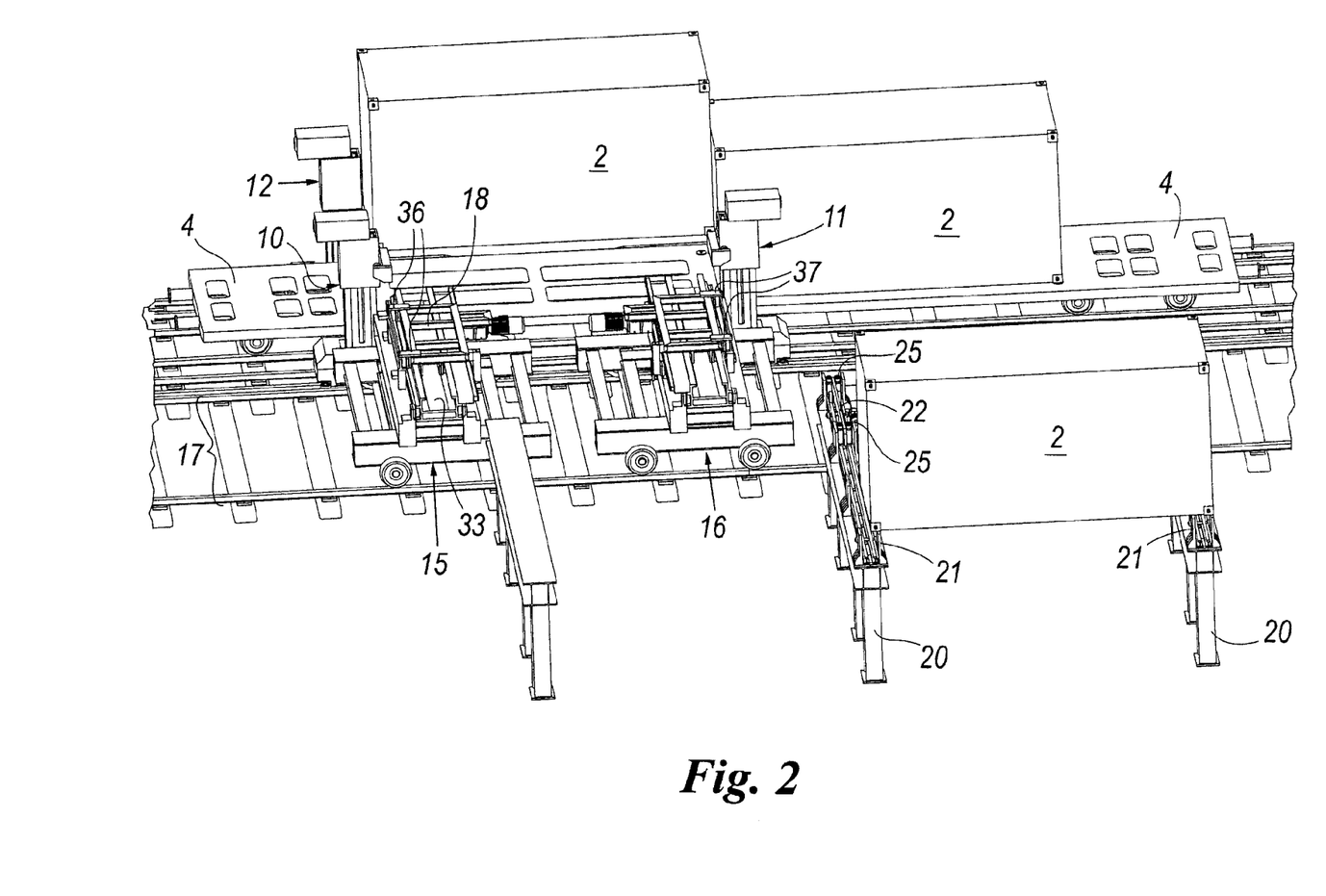
Figure 3:
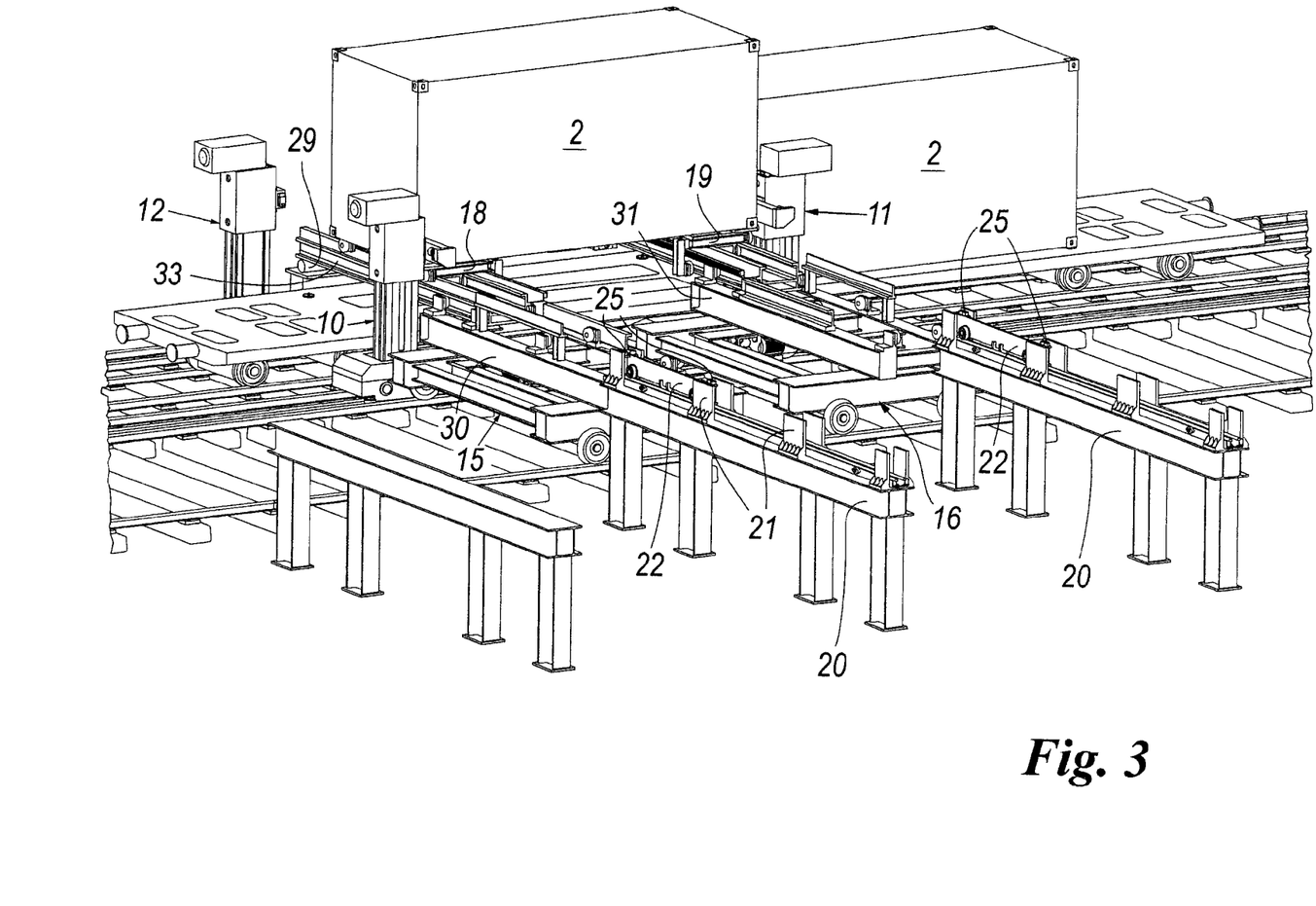

The lifting members 10-13 grip the lift blocks 3 by inserting the lifting pins 14 into the transverse coupling holes 28. Then the lifting members 10-13, by moving the four lifting pins 14 simultaneously upwards, raise the load-containing unit 2 to a prefixed height such as not to interfere with the electric power line 38 overlying the main track 5 (not shown in FIGS. 1-6, but shown in FIG. 7). Meanwhile the two transfer trucks 15 and 16 flank the lifting members 10 and 11 disposed on the same side of the main track 5 (FIG. 2). FIG. 3 shows that the movable bridges 33 and 34 have been extended in the direction of the main track 5 until they touch and rest on the resting elements 29 rigid with the lifting members 12 and 13 disposed on the opposite side of the main track 5, by passing within the vertical space below the lifting pins 14. The transfer trucks 18 and 19 move along the movable bridges 33 and 34 to arrive below the load-containing unit 2.

Figure 4:
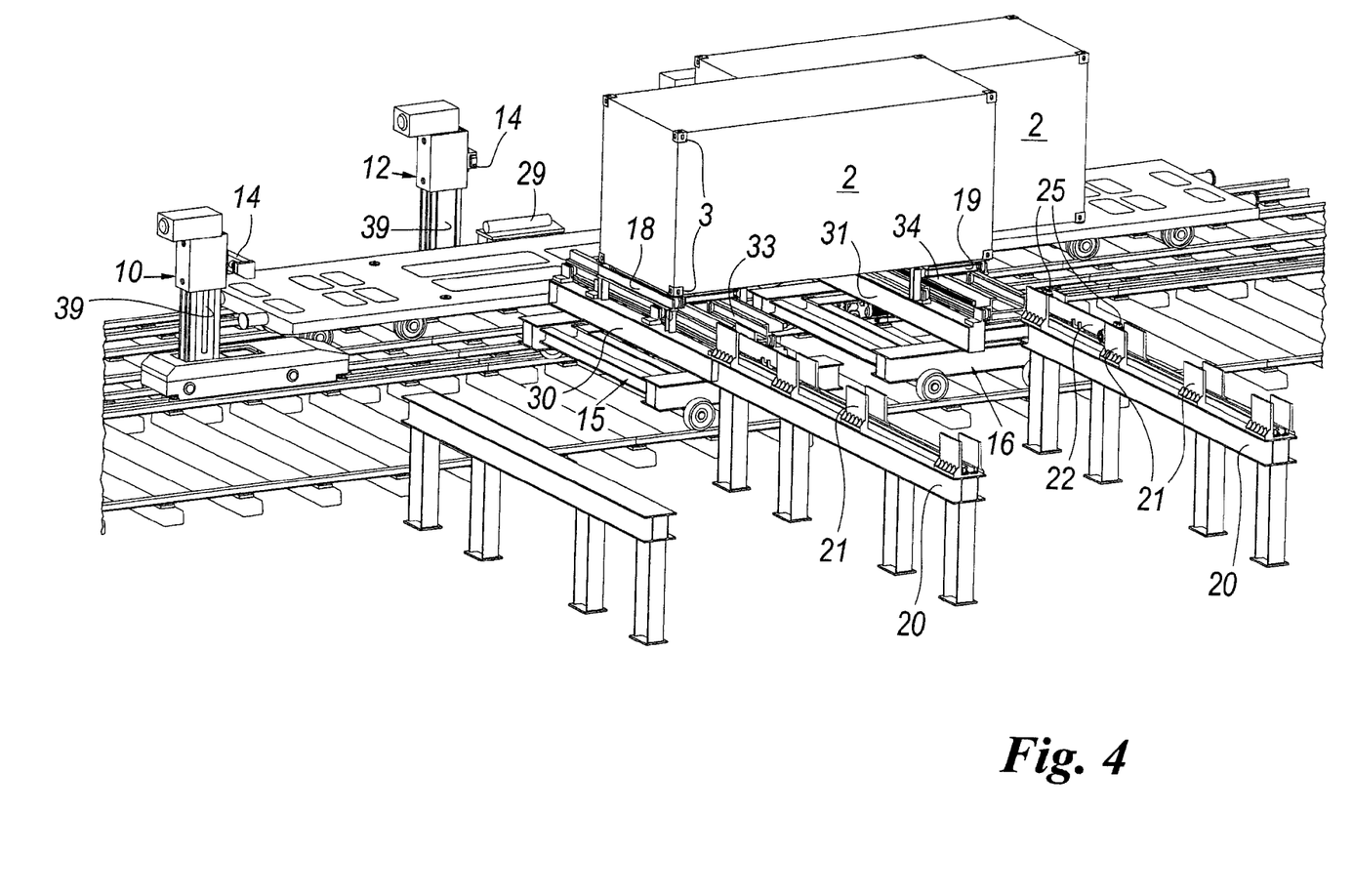

The transfer trucks 15 and 16 are positioned such that those resting surfaces 36 and 37 of the transfer trucks 18 and 19 facing upwards lie below a first part of the lower surfaces of the base lift blocks 3, i.e. the surfaces normal to the vertical direction (H) of FIG. 8 of the base lift blocks disposed in the plane TL (FIG. 8). In the example, the resting surfaces 36 and 37 of the transfer trucks 18 and 19 are disposed below the inner part of the lower surfaces of the lift blocks 3. The lifting members 10-13 transfer the load-containing unit downwards to rest it on the resting surfaces 36 and 37 of the transfer trucks 18 and 19. The lifting pins 14 disengage from the coupling holes 28 and the lifting members 10-13 move to enable the load-containing unit 2 to be transferred in the transverse direction onto the transfer trucks 18 and 19 until above the bases 30 and 31 of the transfer trucks 15 and 16 (FIG. 4). The transfer trucks 15 and 16 move rigidly along the transfer track 17 to align with the stand-by platform 20 on which the load-containing unit 2 is to be deposited.

Figure 5:
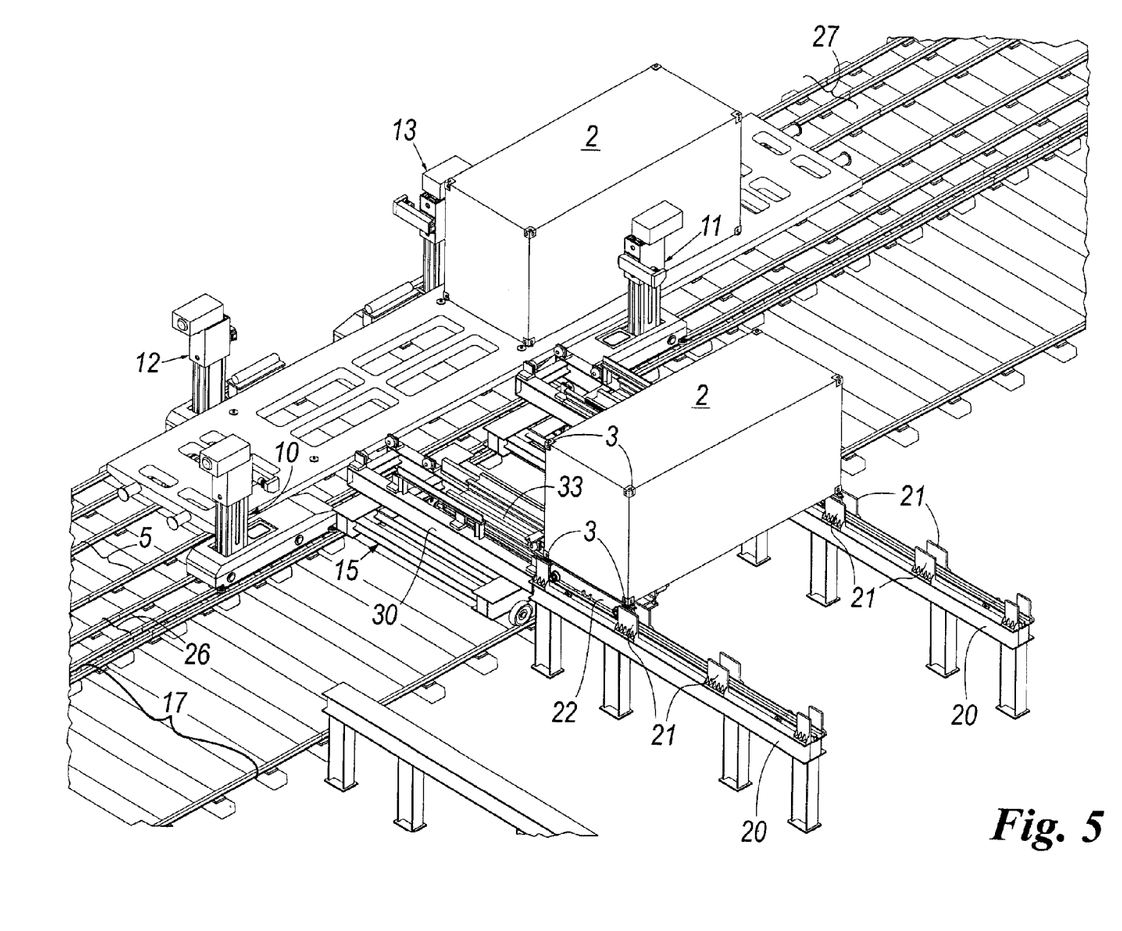
Figure 6:
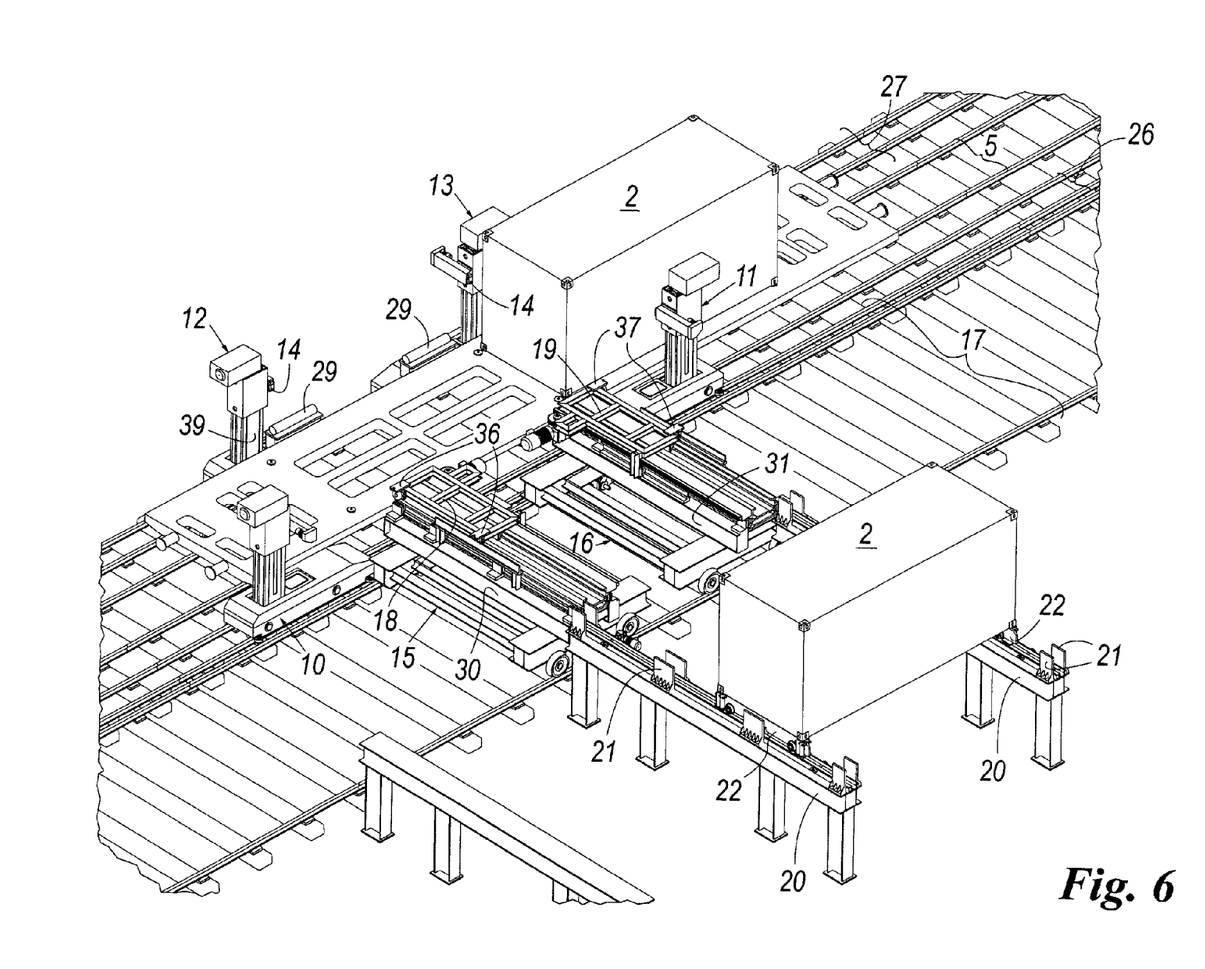
Figure 9:
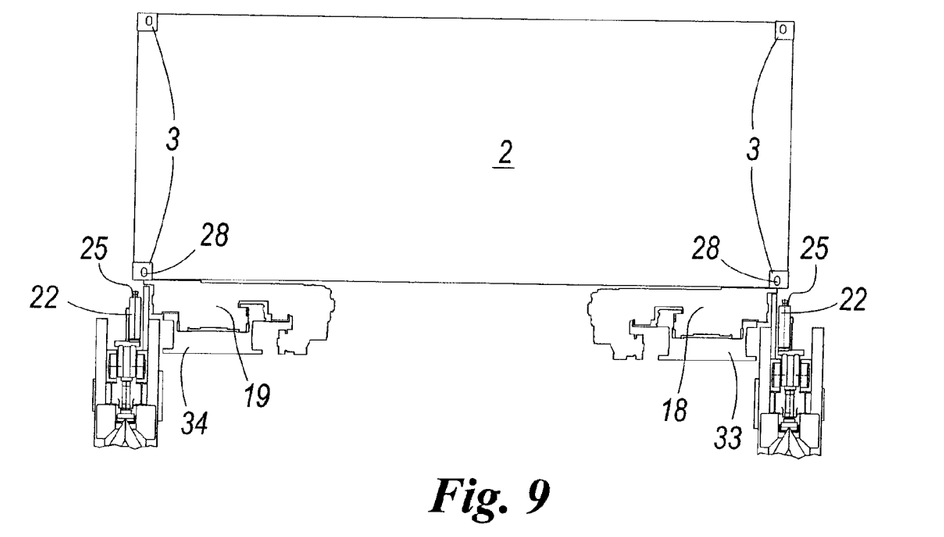
FIG. 9 shows the load-containing unit resting on the transfer trucks.
Figure 10:
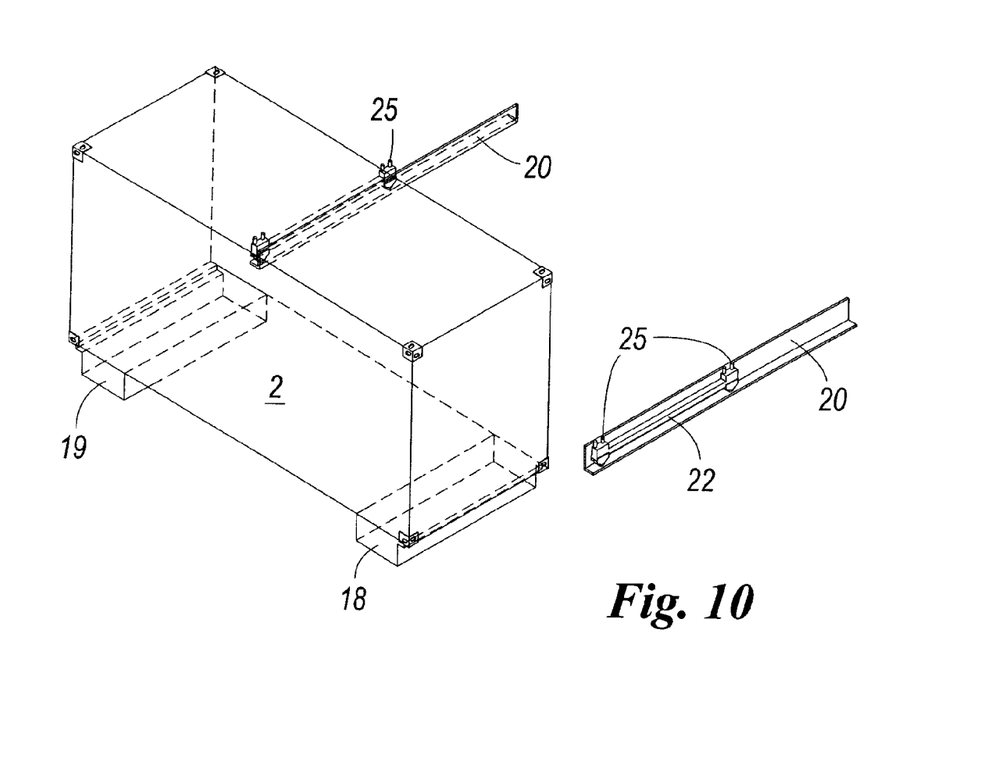
Figure 11:
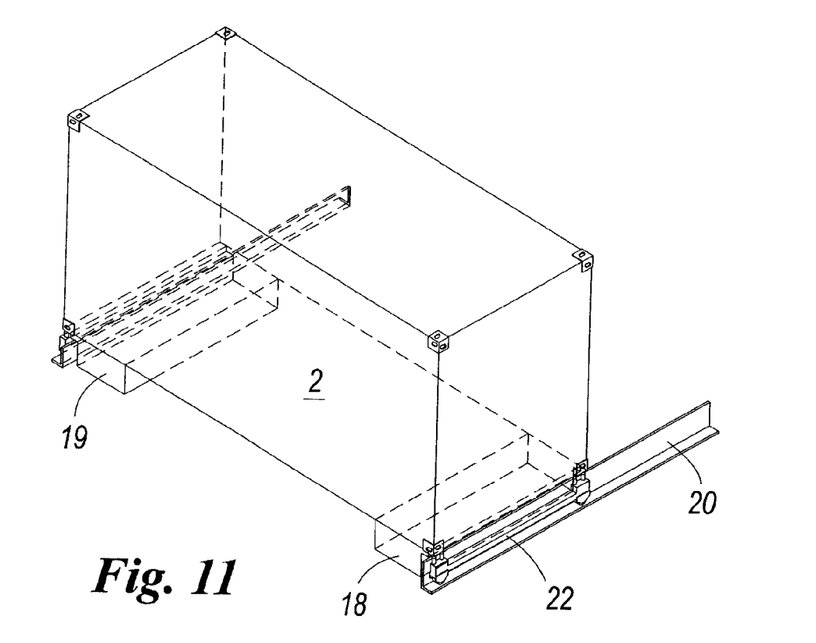
Figure 12:
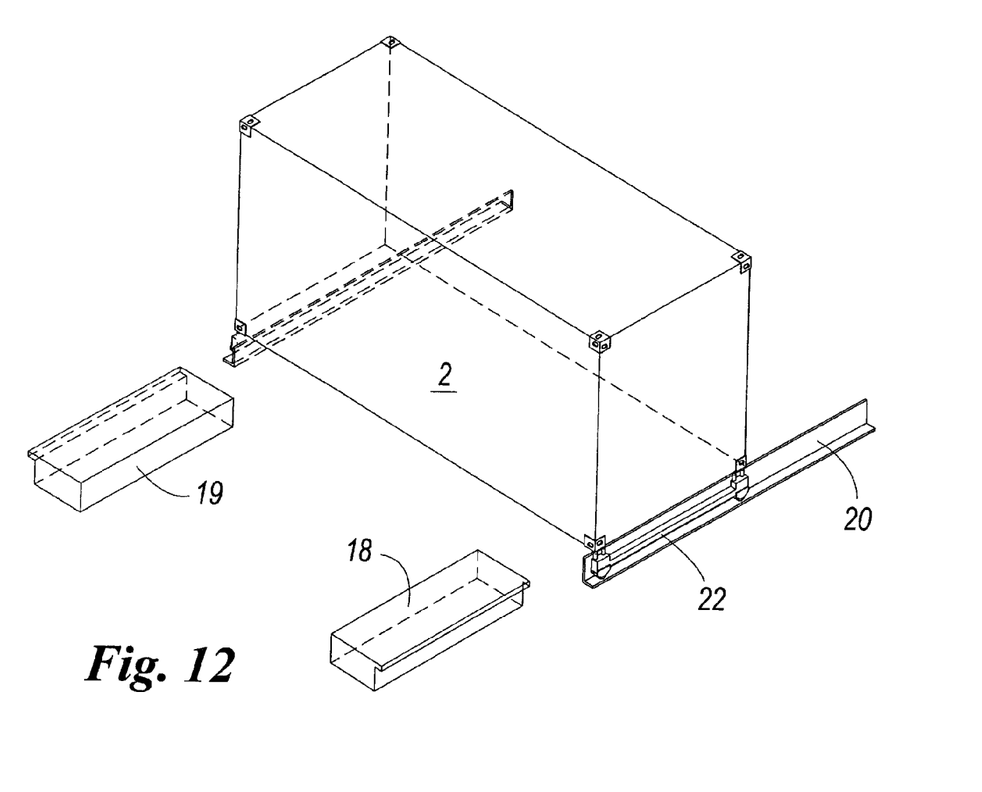

The movable bridges lengthen in the direction of the stand-by platform 20 to penetrate it through a portion substantially equal to the width A of the load-containing unit 2. The ends of the movable bridges 33 and 34 are supported by the stand-by platform 20, to prevent any projecting support of the movable bridges when the load-containing unit 2 transits on them. The transfer trucks 18 and 19 move on the movable bridges to horizontally transfer the load-containing unit until above the stand-by platform 20 (FIG. 5). The positioning trucks move on the stand-by platform 20 to flank the transfer trucks 18 and 19 and position their loading surface 25 below the outer part of the lower surface of the base lift blocks, which rest with the inner part of their lower surface on the resting surfaces 36, 37 of the transfer trucks 18 and 19 (FIG. 9). The positioning trucks 22 raise their loading surface 25 to hence vertically lift the load-containing unit 2 and translate horizontally, to deposit the load-containing unit 2 on the support elements 21 (FIG. 6), which support the load-containing unit on the inner part of the lower surface of the base lift blocks 3. At the same time the transfer trucks 18 and 19 are returned onto the bases 30 and 31 of the transfer trucks 15 and 16, and the movable bridges 33 and 34 are also retracted onto the bases 30 and 31 of the transfer trucks 15 and 16. In this manner the transfer trucks 15 and 16 can be repositioned to unload another load-containing unit. The load-containing units 2 aligned on the stand-by platforms 20, not overlaid by the electric power line, can then be handled by a crane or other means, including self-propelled, for example a bridge crane 40 (shown in FIG. 7), and transferred onto motorized trucks 41. The transfer of the load-containing units from the railway trucks 4 to the stand-by platforms 20 takes place automatically and rapidly, without interference with the railway electric power lines.

The movable bridges, when the load-containing unit transits on them, are never projectingly constrained, but are supported or constrained at both ends with respect to the load transiting on them. A levelling device for the movable bridges 33 and 34 is also advantageously present including on the stand-by platform 20, to ensure perfectly horizontal movement of the transfer trucks 18 and 19 when they transit on the movable bridges 33 and 34 while carrying the load-containing unit 2 from the bases of the transfer trucks 30 and 31 to the stand-by platform 20. Alternatively, such a levelling device for the movable bridges could also be present on the transfer trucks 15 and 16, to regulate the height of the ends of the movable bridges 33 and 34 located on them.

A railway truck can be loaded by a reverse sequence of operations, starting with load-containing units already disposed on the support elements 21 of a stand-by platform 20. Given that a precise arrangement of load-containing units on the stand-by platform is difficult to attain with a crane, the load-containing units could be arranged on the stand-by platform by a system similar to that initially described, comprising lifting members and transfer trucks for handling the arriving load-containing units which are to be loaded onto a railway truck.

It would also be possible for the transfer trucks 18 and 19 to translate vertically when the load-containing unit 2 passes from the lifting members 10-13 to the transfer trucks or from the transfer trucks 18 and 19 to the positioning trucks 22. However the device would be more complicated and redundant in its movements, as the vertical movement is provided by the lifting members above the main track and by the positioning trucks 22 above the stand-by platform.

Hence the present invention is also intended to protect a method for unloading and loading load-containing units 2 presenting lift blocks 3, from and onto railway trucks 4 arranged to move on a main track 5 along a longitudinal travel axis 6, implemented by a system such as that heretofore described, comprising four lifting members 10-13, each provided with a lifting pin 14, two transfer trucks 15 and 16 each comprising a base 30 and 31, a movable bridge 33 and 34, and a transfer truck 18 and 19 with a horizontal resting surface 36 and 37, the system also comprising at least one stand-by platform 20 provided with support elements 21, on which there are disposed positioning trucks 22 presenting a loading surface 25.

The unloading method presents the following steps:

a) four lifting members 10-13 are flanked against the load-containing unit 2, disposed in pairs on opposite sides about the main track 5;

b) four lift blocks 3 not superposed vertically and disposed in pairs on opposite sides about the longitudinal travel axis 6 are gripped by the lifting members 10-13 by inserting their lifting pins into the coupling holes 28 of the lift blocks 3;

c) the load-containing unit 2 is translated vertically by means of the lifting members 10-13;

d) the two transfer trucks 15 and 16 are flanked against the load-containing unit 2 on one side of the main track 5;

e) the movable bridges 33 and 34 are extended in the direction of the main track 5 until their ends rest on the resting elements 29 rigid with the lifting members 12 and 13 disposed on the opposite side to that of the transfer trucks 15 and 16 about the main track 5;

f) the transfer trucks 18 and 19 are moved on the movable bridge and disposed below the base lift blocks 3 of the load-containing unit 2, such that the lift blocks 3 project partially from the vertical through the resting surfaces 36 and 37, in the direction of the longitudinal travel axis 6;

g) the load-containing unit 2 is translated vertically downwards by the lifting members 10-13 by resting the lower surfaces of the lift blocks 3 on the resting surfaces 36 and 37 of the transfer trucks 18 and 19, such that they project partially from them in the direction of the longitudinal travel axis 6;

h) the lift blocks 3 are released from the grip of the lifting members 10-13 by extracting the lifting pins 14 from the coupling holes 28;

i) the transfer trucks 18 and 19 are translated horizontally with the load-containing unit 2 resting thereon, until the load-containing unit 2 is brought above the bases 30 and 31 of the transfer trucks 15 and 16;

j) the movable bridges 33 and 34 are retracted onto the bases 30 and 31 of the transfer trucks 15 and 16;

k) the transfer trucks 15 and 16 are moved rigidly until the load-containing unit 2 is brought to the side of the stand-by platform 20 and aligned with it;

l) the movable bridges 33 and 34 are extended in the direction of the stand-by platform 20 until the movable bridges 33 and 34 and the stand-by platform 20 are made to co-penetrate for a length at least equal to the width A of the load-containing unit 2, the transfer trucks 18 and 19 and the load-containing unit 2 disposed on them remaining substantially at rest on the bases 30 and 31 of the transfer trucks 15 and 16;

m) the movable bridges 33 and 34 are rested on the stand-by platform 20 on the opposite side to the main track 5;

n) the transfer trucks 18 and 19 and the load-containing unit 2 resting on them are translated horizontally on the movable bridges 33 and 34 until the load-containing unit 2 is brought above the stand-by platform 20;

o) two positioning trucks 22 are moved rigidly along the stand-by platform 20 until flanking the transfer trucks 18 and 19, such that the loading surface 25 of the positioning trucks 22 is disposed below the projecting part of the lower surface of the base lift blocks 3;

p) the loading surface 25 of the positioning trucks 22 is raised, so raising the load-containing unit 2 and releasing the transfer trucks 18 and 19;

q) the transfer trucks 18 and 19 are translated horizontally until they are brought above the bases 30 and 31 of the transfer trucks 15 and 16;

r) the movable bridges 33 and 34 are retracted onto the transfer trucks 15 and 16;

s) the load-containing unit 2 is transferred onto the stand-by platform 20 by means of the positioning trucks 22;

t) the load-containing unit 2 is deposited in a suitable position on the stand-by platform 20, by lowering the loading surface 25 of the positioning trucks 22 and resting the now free part of the lower surface of the lift blocks 3 on suitable support elements 21 of the stand-by platform 20.

The method of loading load-containing units 2 onto railway trucks 4 comprises a sequence of steps the reverse of that already described.

It commences with a situation in which the load-containing units 2 are disposed with the lift blocks 3 presenting a first part of the lower surface resting on the upper surface of suitable support elements 21 of one or more stand-by platforms 20 and a second part of the lower surface of the lift blocks 3 free. The railway truck 4 is on the main track 5.

The steps of the loading method are the following:

aa) two positioning trucks 22 are moved onto the stand-by platform 20, to bring the loading surface 25 of the positioning trucks 22 below that part of the lower surface of the lift blocks 3 projecting from the support elements 21;

bb) the loading surface 25 of the positioning trucks 22 is raised by raising the load-containing unit 2 from the support elements 21 by means of the support between the loading surface 25 and at least part of the lower surface of the lift blocks 3 previously projecting from the support elements 21;

cc) two transfer trucks 15 are flanked against the stand-by platform 20 between the stand-by platform 20 and the main track 5, they each comprising a base 30 and 31, a movable bridge 33 and 34 arranged to move in a direction substantially transverse to the main track 5, and a transfer truck 18 and 19 arranged to move on the movable bridge 33 and 34 and presenting a resting surface 36 and 37 for the lift blocks 3;

dd) the movable bridges are extended in the direction of the stand-by platform 20 until one end of them rests on it, the movable bridges 33 and 34 and the stand-by platform 20 co-penetrating for a distance equal to the width A of the load-containing unit 2;

ee) the transfer trucks 18 and 19 are translated horizontally on the movable bridges 33 and 34 until they are above the stand-by platform 20;

ff) the positioning trucks 22 and the load-containing unit 2 are translated as far as that end of the stand-by platform 20 facing the main track 5, such that the load-containing unit 2 is positioned above the transfer trucks 18 and 19;

gg) the loading surface 25 of the positioning trucks 22 is lowered to make those parts of the lower surface of the lift blocks 3 projecting from the loading surface 25 rest on the resting surfaces 36 and 37 of the transfer trucks 18 and 19;

hh) the transfer trucks 18 and 19 and the load-containing unit 2 resting on them are translated horizontally until they are brought above the bases 30 and 31 of the transfer trucks 15 and 16;

ii) the movable bridges 33 and 34 are retracted from the stand-by platform 20 onto the bases of the transfer trucks 15 and 16;

jj) the transfer trucks 15 and 16 are moved rigidly, so moving the load-containing unit parallel to the main track 5 until it flanks the railway truck 4, onto which the load-containing unit is deposited;

kk) two lifting members 12 and 13 disposed on the opposite side to that of the transfer trucks 15 and 16 about the main track 5 are moved onto the secondary track 27, in order to prepare them for supporting the movable bridges 33 and 34;

ll) the movable bridges 33 and 34 are extended in the direction of the main track 5 until their ends rest on the resting elements 29 rigid with the lifting members 12 and 13 disposed on the opposite side to that of the transfer trucks 15 and 16 about the main track 5, the transfer trucks 18 and 19 remaining substantially at rest on the bases 30 and 31 of the transfer trucks 15 and 16;

mm) the transfer trucks 18 and 19 are translated horizontally on the movable bridges 33 and 34 until the load-containing unit 2 rests on it above a railway truck 4 disposed on the main track 5 to the side of the transfer trucks 15;

nn) a further two lifting members 10 and 11 disposed on the opposite side to the two first lifting members 12 and 13 about the main track 5 are flanked against the load-containing unit 2;

oo) four lift blocks 3 not superposed vertically and disposed in pairs on opposite sides about the longitudinal travel axis 6 are gripped by the lifting members 10-13 by inserting their lifting pins 14 into the coupling holes 28 of the lift blocks 3;

pp) the load-containing unit 2 is raised vertically by means of the lifting members 10-13, to free the transfer trucks 18 and 19 from the weight of the load-containing unit 2;

qq) the transfer trucks 18 and 19 are translated horizontally on the movable bridges 33 and 34 until they are brought above the bases 30 and 31 of the transfer trucks 15 and 16;

rr) the movable bridges 33 and 34 are retracted to free the space underlying the load-containing unit 2 and the lifting members 10-13;

ss) the load-containing unit 2 is lowered by means of the lifting members 10-13 to deposit it on the railway truck 4, such that the lower corner blocks are engaged in any retention devices present on the railway truck;

tt) the grip on the lifting members 10-13 by the lift blocks 3 is released by extracting the lifting pins 14 from the coupling holes 28.

In this loading method the following stages corresponding to one or more of the aforedescribed steps are distinguished in particular:

I) the load-containing unit 2 is translated until it is brought above the railway truck 4 disposed on the main track 5;

II) at least two lifting members 10-13 disposed on opposite sides about the main track 5 are flanked against the load-containing unit 2;

III) four lift blocks 3 not vertically superposed and disposed in pairs on opposite sides about the longitudinal travel axis 6 are gripped by the lifting members 10-13 by inserting lifting pins into the coupling holes 28 of the lift blocks 3;

IV) the load-containing unit 2 is translated vertically by the lifting members 10-13, and deposited on the railway truck 4.

The system according to the invention comprises a control unit for controlling and coordinating the multiple movements of the various parts of the system and for implementing the aforedescribed unloading and loading methods.

A characteristic of the unloading and loading method of the invention is that at least two separate lifting members 10-13 disposed on opposite sides about the main track 5 are flanked against the load-containing unit 2 for vertically translating the load-containing unit 2 by achieving a grip on lift blocks 3. This enables interference between the lifting members 10-13 and the electric line disposed above the main track to be avoided and enables the lift blocks 3 to be used to support the weight of the load-containing unit.

Another important characteristic of the unloading and loading method of the invention is that the load-containing unit 2 is moved by resting a first part of the lower surface of the base lift blocks 3 on a first support surface, then resting a second part of the lower surface of the base lift blocks 3 on a second support surface. This characteristic of the method is shown in Figures from 10 to 12. The first or second support surface can comprise the resting surfaces 36 and 37 of the transfer truck 18 and 19, or the loading surfaces 25 of the positioning trucks 22, or again the upper surfaces of the support elements 21 of the stand-by platform 20. In this respect, the two transfer trucks 18 and 19 are each positioned below two lift blocks 3 such that only a first part of the lower surface of the lift blocks 3 goes to rest on the resting surfaces 36 and 37 of the transfer trucks 18 and 19, as clearly shown in FIG. 9.

These resting surfaces 36 and 37 of the transfer trucks 18 and 19 also present vertical pins to be inserted into the lower coupling holes 28 for greater safety while moving the load-containing unit.

The transfer trucks 18 and 19 are then flanked by the positioning trucks 22, which lie below the load-containing unit 2 such that their loading surface 25 is positioned below the free part of the lower surface of the base lift blocks 3. The second part of the lower surface of the lift blocks 3 comprises at least part of the free surface, i.e. not directly resting on the resting surfaces 36 and 37 of the transfer trucks 18 and 19. The movement of the positioning truck 22 enables the weight of the load-containing unit 2 to pass from the transfer trucks 18 and 19 to the positioning truck 22, by resting the second part of the lower surface of the base lift blocks 3 on the loading surface 25 of the positioning truck 22. During this stage, the free surface comprises the initially rested surface. Subsequently, when the load-containing unit passes from the positioning truck 22 to the stand-by platform 20, a part of the now free surface is rested on the support elements 21.

This method enables the load-containing unit to be transferred from one mover member to another while always discharging the weight of the load-containing unit via the lift blocks 3 and without complicated manoeuvres requiring engagement in the coupling holes 28. Inserting pins into the coupling holes 28 is only required in that stage in which the load-containing unit 2 is to be raised from the railway truck 4 or rested on it, as the lower surface of the base lift blocks 3 is inaccessible during the entire operation.

By virtue of the fact that the method is implemented by an automatic system, the unloading of load-containing units from railway trucks and their arrangement on stand-by platforms takes place rapidly, with considerable gains in depot efficiency.

Moreover, as the load-containing units are moved only via the lift blocks 3, which are already standardized both in their shape and in their arrangement, no modifications are required either to the railway trucks or to the load-containing units.

The invention claimed is:

1. A system for unloading and loading load-containing units presenting lift blocks from and onto railway trucks arranged to move on a main track along a longitudinal travel axis, comprising the main track, at least two lifting members separated at least in space above the main track, and able to flank the load-containing unit on opposite sides about the main track and to translate the load-containing unit vertically by achieving a grip on the lift blocks of the load-containing units, said lifting members being movable horizontally in a direction parallel to the main track, and said lifting members being independently movable with respect to one another;

at least two primary transfer trucks disposed on a side of the main track and movable in a direction parallel to the main track; said at least two primary transfer trucks movable in a direction parallel to the main track disposed on the same side of the main track and movable independently with respect to one another to accommodate load-containing units of different dimensions to be loaded and unloaded;

wherein said at least two primary transfer trucks each comprise a base and a movable bridge for moving substantially in a horizontal direction transverse to the longitudinal travel axis, wherein said movable bridge is linearly reciprocally movable substantially in said horizontal direction in a plane normal to the longitudinal travel axis, wherein the base comprises a guide path for the transverse horizontal movement of the moveable bridge on an upper surface of the base; and wherein said at least two primary transfer trucks each comprise a respective secondary transfer truck reciprocally movable on an upper surface of the movable bridge in a direction substantially transverse to the main track;

wherein each said secondary transfer truck is for directly supporting the load-containing units.

2. A system for unloading and loading load-containing units as claimed in claim 1, wherein an upper surface of the moveable bridge is exposed for the secondary transfer truck to be moveable across the entire upper surface of the moveable bridge.

3. A system for unloading and loading load-containing units as claimed in claim 2, comprising two secondary tracks comprising rails disposed on the two sides of the main track and parallel to the main track, for moving the lifting members.

4. A system for unloading and loading load-containing units as claimed in claim 2, comprising four lifting members, each of which is independently movable.

5. A system for unloading and loading load-containing units as claimed in claim 1, wherein each lifting member comprises at least one lifting pin presenting an axis (S) disposed horizontally in a plane substantially normal to the longitudinal travel axis, said lifting pin being arranged to translate in the vertical direction and to slide in the direction of the axis (S) of the lifting pin.

6. A system for unloading and loading load-containing units as claimed in claim 1, wherein said movable bridge of each primary transfer truck is linearly reciprocally movable substantially in a horizontal direction transverse to the longitudinal travel axis and said secondary transfer truck of each primary transfer truck is linearly reciprocally movable on the respective movable bridge in a direction substantially transverse to the main track.

7. A system for unloading and loading load-containing units as claimed in claim 1, wherein each base has a first longitudinal end and an opposed second longitudinal end, wherein the moveable bridge is slidably mounted to move substantially horizontally transverse to the longitudinal travel axis from a first position extending beyond the first longitudinal end to a second position extending beyond the second longitudinal end.

8. A system for unloading and loading load-containing units as claimed in claim 1, comprising at least one transfer track parallel to the main track, for moving the primary transfer trucks.

9. A system for unloading and loading load-containing units as claimed in claim 1, comprising at least one resting element for supporting an end of the movable bridge on an opposite side to a side of the primary transfer truck about the main track.

10. A system for unloading and loading load-containing units as claimed in claim 9, wherein said secondary transfer truck is linearly reciprocally movable on the movable bridge in a direction substantially transverse to the main track.

11. A system for unloading and loading load-containing units as claimed in claim 10, wherein at least one of the lifting members has a shape to enable the secondary transfer truck to pass below a lifting pin.

12. A system for unloading and loading load-containing units as claimed in claim 1, comprising a device for leveling the movable bridge.

13. A system for unloading and loading load-containing units as claimed in claim 1, comprising at least one stand-by platform presenting elements for supporting the load-containing units via the lift blocks.

14. A system for unloading and loading load-containing units as claimed in claim 13, comprising at least one positioning truck movable along the stand-by platform.

15. A system for unloading and loading load-containing units as claimed in claim 14, wherein said positioning truck is able to translate the load-containing unit vertically and horizontally.

16. A system for unloading and loading load-containing units as claimed in claim 1, further comprising a stand-by platform arranged to support the movable bridge at one end.

17. A system for unloading and loading load-containing units as claimed in claim 16, wherein the stand-by platform and the movable bridge achieve a mutual co-penetration equal to a width (A) of the load-containing unit.

18. A system for unloading and loading load-containing units as claimed in claim 1, wherein the lifting members comprise a device for automatically recognizing coupling holes in the lift blocks.

19. A method of using the system of claim 1 for unloading and loading load-containing units presenting lift blocks from and onto railway trucks arranged to move on a main track along a longitudinal travel axis, implemented by a system comprising at least two lifting members, comprising the following steps:

a) flanking at least two separated lifting members against the load-containing unit, on opposite sides about the main track;

b) achieving a grip on at least three lift blocks by means of the lifting members;

c) translating the load-containing unit vertically by means of the lifting members.

20. A method for unloading and loading load-containing units as claimed in claim 19, wherein the load-containing unit is moved by resting a first part of the lower surface of the base lift blocks on a first support surface, then resting a second part of the lower surface of the base lift blocks on a second support surface.

21. A system for unloading and loading load-containing units presenting lift blocks from and onto railway trucks arranged to move on a main track along a longitudinal travel axis, comprising:

the main track, at least two lifting members separated at least in space above the main track, and able to flank the load-containing unit on opposite sides about the main track and to translate the load-containing unit vertically by achieving a grip on the lift blocks, two secondary tracks disposed on two sides of the main track and parallel to the main track, for moving the lifting members;

at least two primary transfer trucks disposed on a same side of the main track and movable in a direction parallel to the main track, said at least two transfer trucks being movable independently with respect to one another to accommodate load-containing units of different dimensions to be loaded and unloaded;

at least one transfer track parallel to the main track, for moving the primary transfer truck;

wherein each said primary transfer truck comprises a base and a respective movable bridge to be moved substantially in a horizontal direction in a plane normal to the longitudinal travel axis, wherein said movable bridge is linearly reciprocally movable substantially in said horizontal direction in a plane normal to the longitudinal travel axis, wherein the base comprises a guide path for the transverse horizontal movement of the moveable bridge on an upper surface of the base;

at least one resting element for supporting an end of the movable bridge on an opposite side to a side of the transfer truck about the main track;

wherein said at least one primary transfer truck comprises a respective secondary transfer truck reciprocally movable on the movable bridge in a direction substantially transverse to the main track;

wherein each said secondary transfer truck is for directly supporting the load-containing units.

22. A system for unloading and loading load-containing units as claimed in claim 21, further comprising:

a control unit for controlling and coordinating multiple movements of the at least two lifting members to flank the load-containing unit on opposite sides about the main track and to translate the load-containing unit vertically by achieving the grip on lift blocks and controlling and coordinating multiple movements of the at least two transfer trucks to flank the two first transfer trucks against the load containing unit.

* * * * *